(12) United States Patent
Naaktgeboren et al.

(10) Patent No.: US 9,010,241 B2
(45) Date of Patent: Apr. 21, 2015

(54) SQUARE BALER COMPRISING A STUFFER

(75) Inventors: Adrianus Naaktgeboren, Varsenare (BE); Pieter Vandévelde, Sint Michiels Brugge (BE); Jan Mennik, VM Emmen (NL)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/122,571

(22) PCT Filed: May 29, 2012

(86) PCT No.: PCT/EP2012/060020
§ 371 (c)(1),
(2), (4) Date: Nov. 26, 2013

(87) PCT Pub. No.: WO2012/163903
PCT Pub. Date: Dec. 6, 2012

(65) Prior Publication Data
US 2014/0076178 A1    Mar. 20, 2014

(30) Foreign Application Priority Data

May 30, 2011    (BE) .................................. 2011/0329

(51) Int. Cl.
| | |
|---|---|
| A01F 15/10 | (2006.01) |
| B30B 15/30 | (2006.01) |
| B30B 9/30 | (2006.01) |

(52) U.S. Cl.
CPC .................................... *A01F 15/101* (2013.01)

(58) Field of Classification Search
USPC ......... 100/7, 142, 179, 188 R, 189, 215, 240; 56/341, 344, 438, 440, 443, 446
See application file for complete search history.

(56) References Cited

U.S. PATENT DOCUMENTS

| | | | | |
|---|---|---|---|---|
| 5,467,702 | A * | 11/1995 | Naaktgeboren et al. | ........ 100/35 |
| 6,050,074 | A * | 4/2000 | Clostermeyer | .................. 56/341 |
| 6,385,952 | B1 * | 5/2002 | Bergkamp et al. | .............. 56/341 |
| 6,862,876 | B2 | 3/2005 | Amstel Van et al. | |
| 8,561,532 | B2 | 10/2013 | Bergmann | |
| 2002/0112617 | A1 * | 8/2002 | Leupe et al. | ..................... 100/4 |

FOREIGN PATENT DOCUMENTS

| | | |
|---|---|---|
| EP | 1769674 A1 | 4/2007 |
| FR | 2863821 A1 | 6/2005 |

* cited by examiner

*Primary Examiner* — Jimmy T Nguyen
(74) *Attorney, Agent, or Firm* — Patrick M. Sheldrake; Seyed V. Sharifi T.

(57) ABSTRACT

A stuffer includes an arm connected at a first pivot point to a crank arm that is driven to rotate at a multiple of the cycling rate of the plunger, and the arm is acted upon at a second pivot point by a cam track and follower arrangement selectively driven with the crank arm by a disengageable clutch.

9 Claims, 8 Drawing Sheets

SQUARE BALER COMPRISING A STUFFER

This application is the US National Stage filing of International Application Serial No. PCT/EP2012/060020 filed on May 29, 2012 which claims priority to Belgian Application BE2011/0329 filed May 30, 2011, each of which is incorporated herein by reference in its entirety.

FIELD OF THE INVENTION

The present invention relates to square balers.

BACKGROUND OF THE INVENTION

A baler is an agricultural implement which is used to gather crop material that has been deposited on the ground in swaths or windrows and to pack the crop into tied bales. Balers, which may be self-propelled but are more commonly towed by a tractor and driven by the power take off (PTO) shaft of the tractor, fall into two categories, namely, round balers and square balers. Round balers, as their name implies, produce cylindrical bales but this invention is concerned only with square balers that produce bales of square or rectangular section.

Square balers have a baling chamber of square cross-section with a reciprocating plunger at one end and open at the other end. An intake duct communicates with the baling chamber near its end closed by the plunger. Crop material is loaded into the intake duct by a pickup to form a slice of crop material. Once the slice has reached a desired density, a so-called stuffer transfers the slice into the baling chamber where it is compressed between the plunger and the crop material already present in the baling chamber. After a bale of the desired size has been formed by compressing several such slices, twine is wrapped around the bale and tied to complete the baling process. The baling chamber is longer than a single bale so that the tied bale remains within the baling chamber in order to offer the resistance needed to allow the next bale to be compressed. As square balers are known and well documented in the prior art, it is not believed necessary to provide further detail of their construction within the present context.

The present invention is concerned with the preparation of slices within the intake duct and with the transfer of the slices by the stuffer from the intake duct into the baling chamber.

The intake duct communicates at its upper end with the baling chamber and at its lower end with a packer or rotor. The packer or rotor has rotating blades or tines that propel the crop material picked up from the ground towards the upper end of the duct in order to achieve an even distribution and a constant density within each slice of crop material. Once the crop material attains a desired density within the intake duct, as determined by a sensor, a cycle of the stuffer is commenced to transfer that slice into the baling chamber.

The stuffer operates in the same manner as a rake and has two mechanically driven arms carrying a tine bar at their free end. The upper surface of the intake duct has elongated slots that allow the tines of the stuffer to enter into the duct to engage the crop material packed within it. The movement of the arms causes the tines to follow a generally kidney shaped path so that they sweep along the entire intake duct to push the slice into the baling chamber. On reaching the upper end of the intake duct, they are retracted from the intake duct and return outside intake duct to a position near the lower end of the duct in readiness for the next stuffer cycle.

A problem that can on occasions be encountered is that the packer cannot propel the crop material sufficiently into to the intake duct to achieve an even distribution within the intake duct. As a result, the crop material is denser near the packer than at its upper end near the baling chamber. Aside from creating bales of uneven density, there is risk that clogging may occur near the lower end of the intake duct.

U.S. Pat No. 6,050,074 teaches using the stuffer to assist in redistributing the crop material within the intake duct. This is achieved by operating the stuffer in one of two modes. In a first mode, the stuffer performs a short packer stroke so that it only displaces the crop material part way along the intake duct. In the second mode, the stuffer performs a full stuffer stroke to transfer the contents of the intake duct into the baling chamber.

OBJECT OF THE INVENTION

The mechanism employed in U.S. Pat. No. 6,050,074 to drive the stuffer uses a complex system of levers and the aim of the present invention is achieve a similar result using a simpler and more compact stuffer drive mechanism.

SUMMARY OF THE INVENTION

In accordance with the present invention, there is provided a square baler having a baling chamber, a plunger reciprocably mounted in the baling chamber for compressing crop material, an intake duct within which slices of crop material are accumulated for transfer into the baling chamber, a pickup for picking up crop material resting on the ground and introducing the crop material into the intake duct, and a stuffer having tines that may selectively execute a packer stroke to advance crop material partially along the intake duct and a stuffer stroke to transfer the crop material accumulated in the intake duct into the baling chamber, characterised in that the stuffer comprises a stuffer arm connected at a first pivot point to a crank arm that is driven to rotate at a multiple of the cycling rate of the plunger, and the stuffer arm is acted upon at a second pivot point by a cam track and follower arrangement selectively driveable in synchronism with the crank arm by way of a disengageable clutch.

The invention operates on the principle that if, in one mode, the second pivot point of the stuffer arm is held stationary, then the tines disposed on its free end follow a first kidney shaped path. The maximum depth of the path is determined by the length of the crank arm but the length of its sweep through the intake duct will depend on the position of the second pivot point relative to the axis of rotation of the crank arm and relative to the intake duct.

If, in a second mode, the second pivot point is moved in synchronism with the crank on which the stuffer arm is mounted, then the length of the sweep can be increased or decreased, depending on the direction of movement of the second pivot point.

There are several possible ways of implementing the invention:

1. The second pivot point of the stuffer arm may either be nearer to or further from the intake duct than the first pivot point.
2. The first mode in which the second pivot point is held stationary may either be the stuffer mode or the packer mode, depending on whether the movement of the second pivot point serves to increase or decrease the length of the sweep along the intake duct by the stuffer tines.
3. The second pivot point may comprise a cam track on the stuffer arm engaged by a follower carried by a second crank arm that is selectively rotated in synchronism with the first crank arm or the stuffer may comprise a follower engaging in a cam track that is itself moved in synchronism with the first crank arm.

It is preferred for the first crank pin be rotated at twice the frequency of the plunger so that the stuffer arm may perform a packer stroke followed by a stuffer stroke during each reciprocation of the plunger.

It is further preferred for the crank arm or cam track associated with the second pivot point to be driven by a clutch designed for engagement to take place in synchronism with the movement of the plunger, such that the tines reach the baling chamber end of the intake duct as the plunger is about to commmence a compression stroke.

BRIEF DESCRIPTION OF THE DRAWINGS

The invention will now be described further, by way of example, with reference to the accompanying drawings, in which.

DETAILED DESCRIPTION OF THE PREFERRED EMBODIMENT(S)

Figure 1:
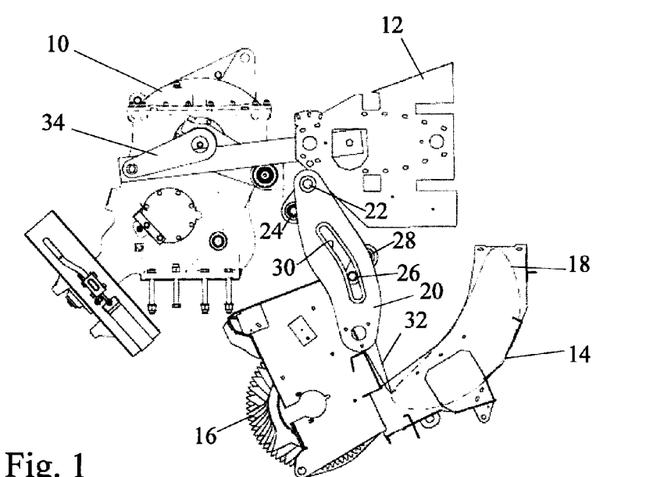
FIGS. 1 to 4 show a first embodiment of the invention at four different stages while performing a stuffer stroke.
Figure 2:
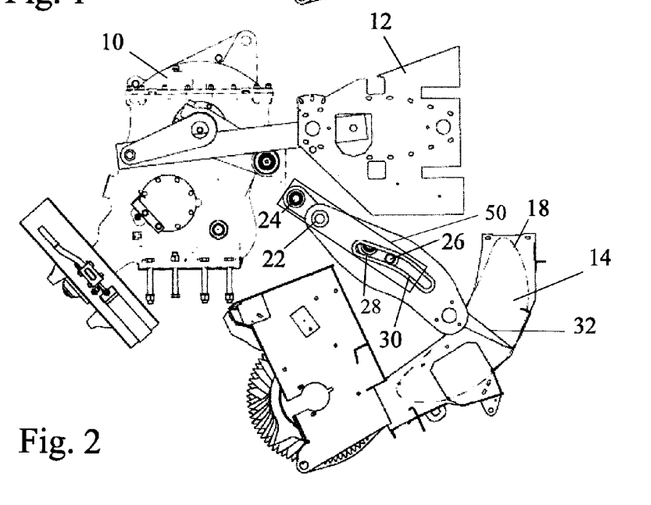
Figure 3:
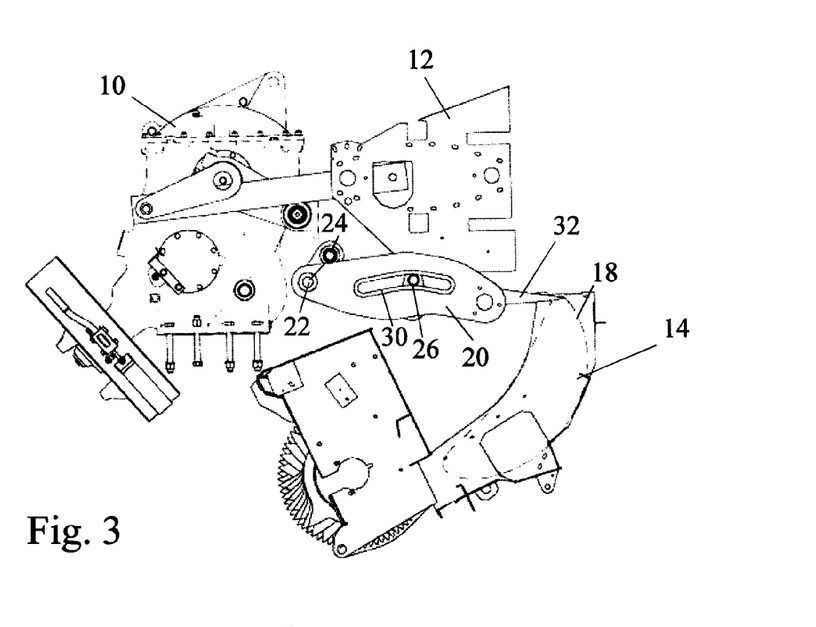
Figure 4:
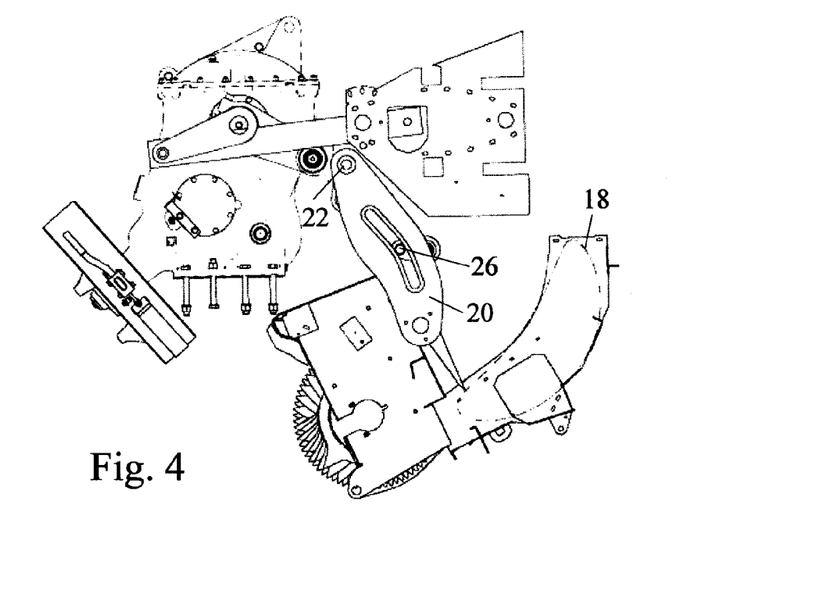
Figure 5:
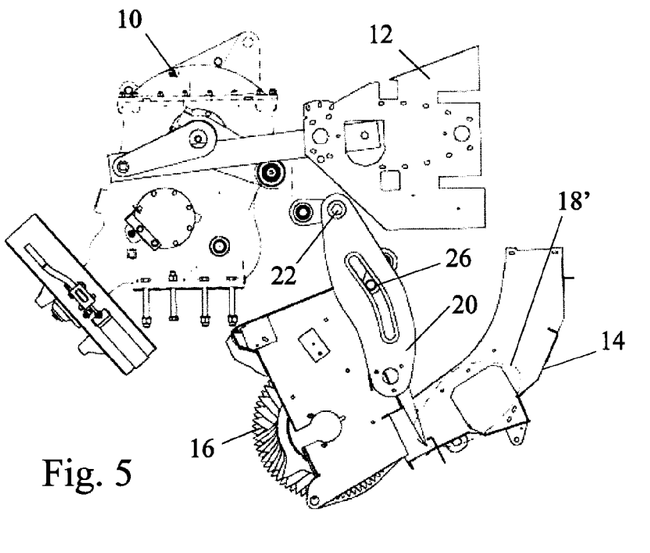
FIGS. 5 to 8 show the embodiment of FIGS. 1 to 4 at different stages while performing a packer stroke.
Figure 6:
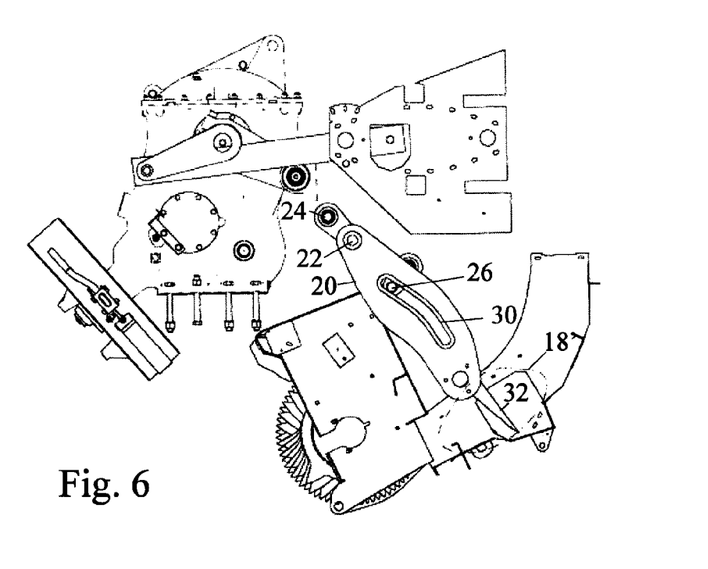
Figure 7:
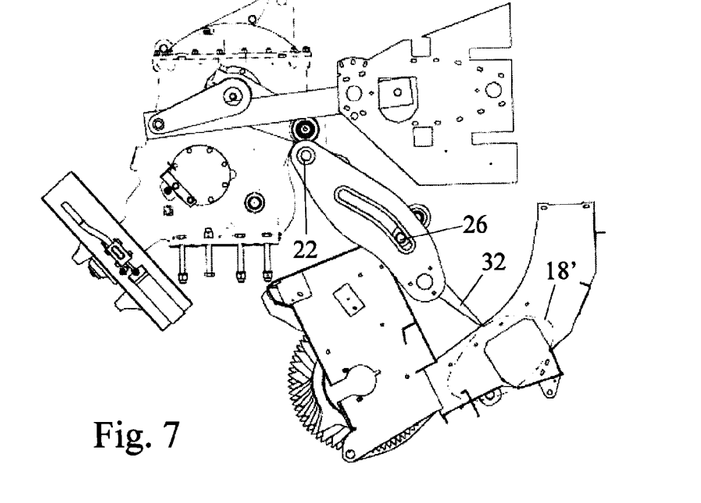
Figure 8:
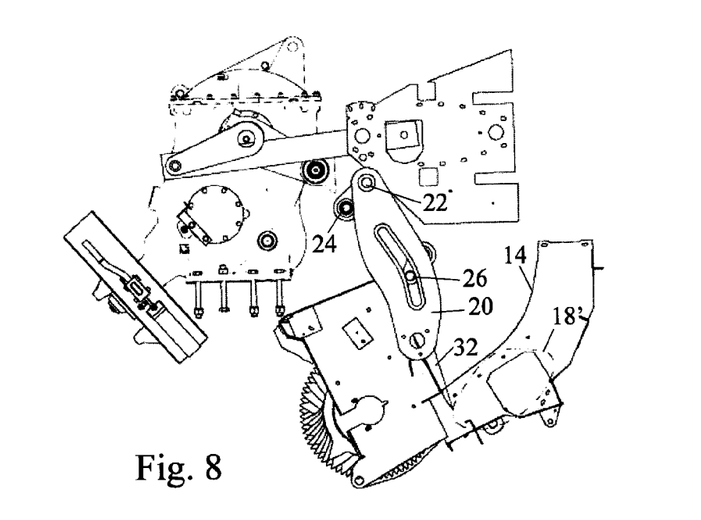

FIGS. 1 to 8 show a first embodiment of the invention that comprises a gearbox 10 driven by the PTO shaft of a tractor and in turn driving a crank arm 34 that causes a plunger 12 to reciprocate within a baling chamber (not shown). Crop material is introduced into the baling chamber by means of an upwardly concave intake duct 14 having a rotor 16 at its lower end and communicating it at its upper end with the baling chamber.

In operation, crop material is picked up from the ground by a pickup (not shown) and fed to the rotor 16, which then propels the crop material along the intake duct 14.

Two stuffer arms 20 are symmetrically arranged one on each side of the baler and tines 32 are mounted on a tine bar that extends between the two stuffer arms 20. The intake duct 14 has slots in its upper concave surface through which the tines 32 can enter into the duct to push the crop material along the intake duct.

When a complete slice of crop material has been accumulated within the intake duct 14, the stuffer arm 20 is operated in a first mode, herein termed a stuffer mode, to move tines 32 along a kidney shaped path 18 shown in FIGS. 1 to 4. In this mode, the stuffer acts to transfer the contents slice formed within the intake duct into the baling chamber.

As shown in FIGS. 5 to 8, the tines can in an alternative mode, termed the packer mode, be driven to follow a modified path 18'. In this mode, the depth of the path 18' is the same as that of the path 18 but the sweep along the intake duct 14 is much shorter terminating well before the tines reach the baling chamber. In this mode of operation, the crop material in the intake duct is merely redistributed within the intake duct by moving it away from the packer 16 and nearer to the upper end of the intake duct.

In both modes, movement of the stuffer arm is brought about by the action of two crank pins 22 and 26 mounted on crank arms of two shafts 24 and 28. The stuffer arm 20 is pivoted on the crank pin 22, while the crank pin 26 serves as a follower of a cam track 30 formed in the stuffer arm 20. Both of the shafts 24 and 28 are driven by the gearbox at twice the speed of the crank arm 34 driving the plunger 12. In the case of the shaft 24 the connection to the gearbox 10 is permanently engaged while the shaft 28 is driven through a clutch 50 that may be selectively disengaged.

It can be seen from FIGS. 5 to 8 that during operation in the packer mode, the shaft 28 and with it the follower 26 remains stationary as the shaft 24 rotates. The circular movement of the end of the stuffer arm caused by the rotation of the crank pin 22 can be resolved into two components. The component generally parallel to the line passing through the two crank pins 24 and 26 moves the tines radially with respect to the curvature of the intake duct, while the crank pin 26 slides up and down along the length of the cam track 30. The component of movement transverse to this direction causes the stuffer arm to pivot about the crank pin 26 so that the tines sweep tagentially along the length of the intake duct following the path designated 18', which only reaches part of the way along the intake duct 14. The sweep along the length of the intake duct 14 is determined by length of the arm on which the crank pin 22 is mounted and the mechanical advantage of the stuffer arm 20, as determined by the ratio of the distance of the shaft 28 from the intake duct 14 to its distance from the shaft 24.

In the stuffer mode, on the other hand, as shown in FIGS. 1 to 4, both of the shaft 24 and 28 are rotated at the same speed but in opposite directions. The effect of the rotation of the second shaft second shaft 28 can be seen from FIG. 3 to increase the sweep of the tines 132 to reach the baling chamber at the top of their stroke.

Figure 9:
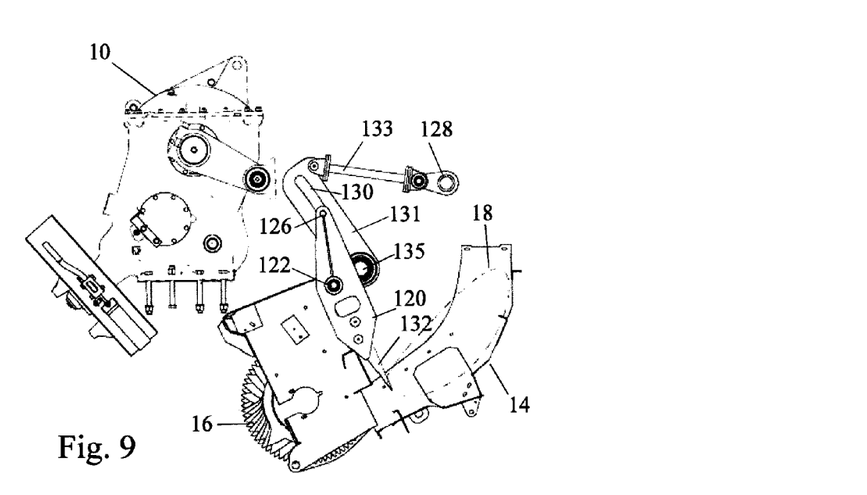
FIGS. 9 to 12 show a second embodiment of the invention at four different stages while performing a stuffer stroke.
Figure 10:
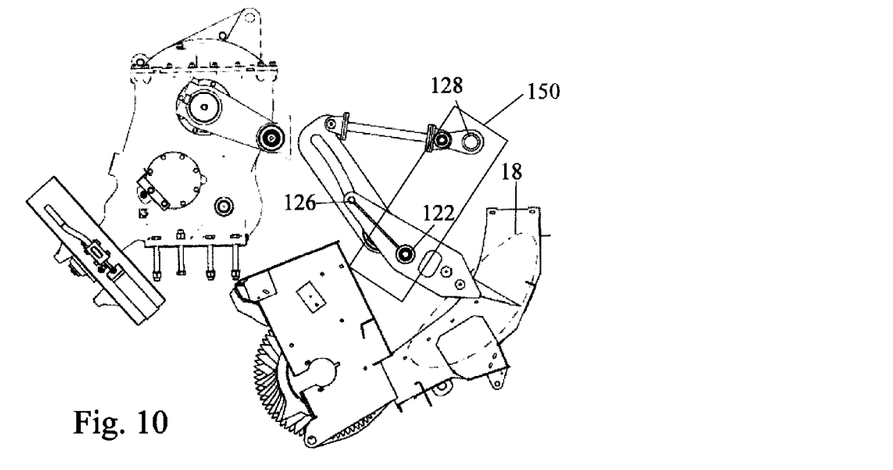
Figure 11:
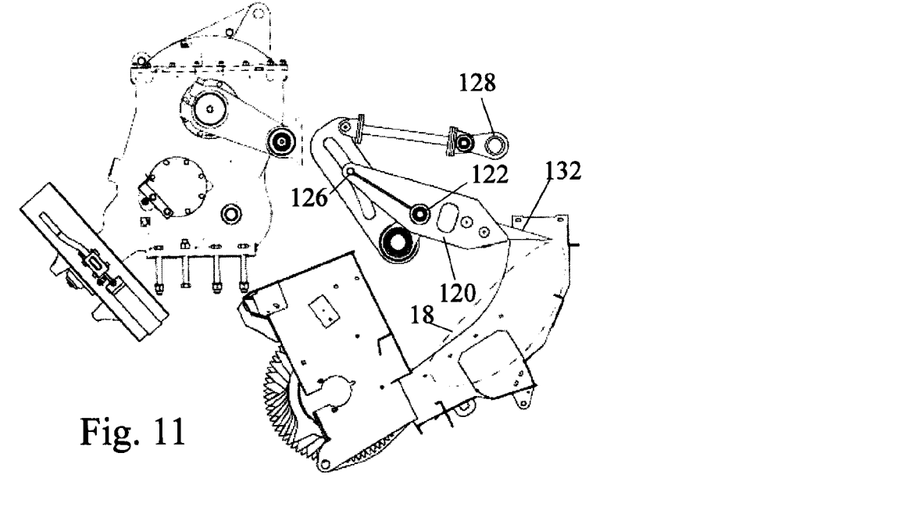
Figure 12:
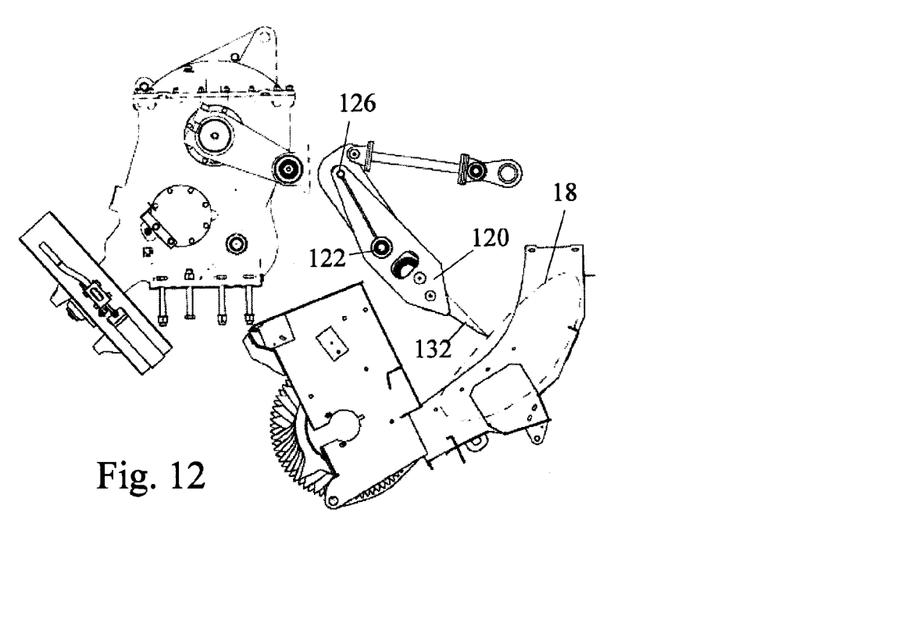
Figure 13:
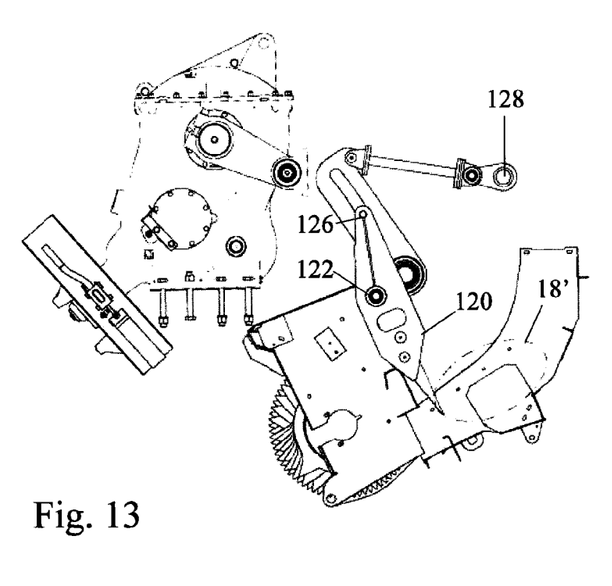
FIGS. 13 to 16 show the embodiment of FIGS. 9 to 12 at four different stages while performing a packer stroke.
Figure 14:
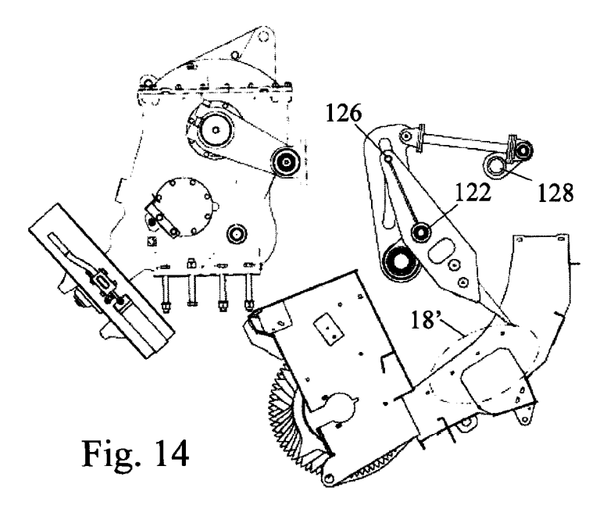
Figure 15:
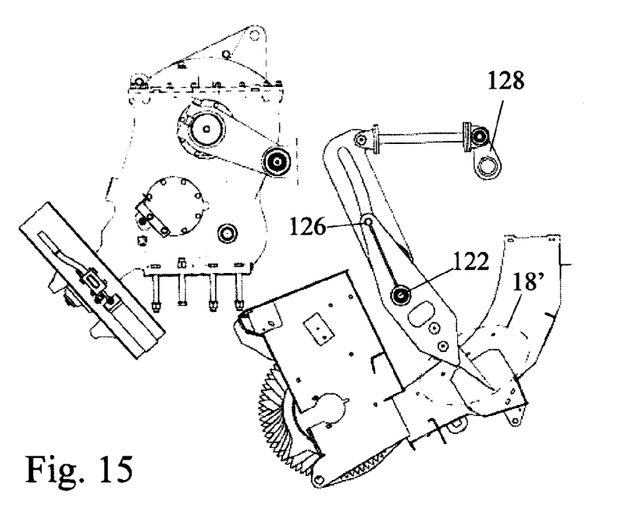
Figure 16:
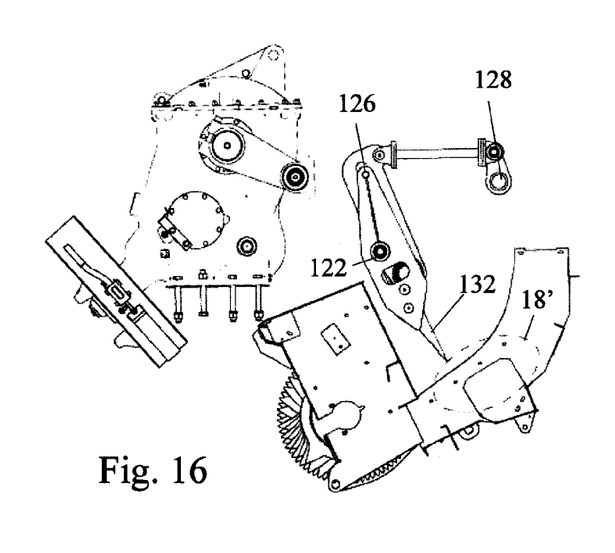

In common with the embodiment described above, the embodiment of FIGS. 9 to 16 has a stuffer arm 120 having a first pivot point connected to a crank pin 122 that is permanently driven in synchronism with the crank arm 34 of the plunger. The stuffer arm 120 also has a second pivot point 126 that is moved by the engagement of a follower in a cam track. The two embodiments differ however in that the second pivot point 126 is disposed further from the intake duct 14 than the first pivot point 122 and the cam track 130 is not formed in the stuffer arm 120 but on a lever 131 pivotable about an axle 135 under the action of a second crankshaft 128 which is connected to the lever 131 by a connecting rod 133. The second crank shaft 128 is drivable at the speed of rotation of the crank pin 122 by way of a selectively engageable clutch 150.

It can be seen from FIGS. 9 to 12 that while performing a stuffer cycle, the second pivot point 126 in this embodiment of the invention is maintained stationary while the crank pin 122 rotates. The phase of rotation of the crank pin 122 is synchronised with the reciprocation of the plunger so that the tines 132 reach the top of their stroke when the plunger 12 is fully retracted from the baling chamber.

In order to perform a packer stroke, the crank shaft 128 is rotated at the same speed and in phase with the rotation of the crank pin 122 by engagement of its driving clutch. By comparing FIG. 11 with FIG. 14, it will be seen that in this embodiment the movement of the second point is designed to reduce the sweep of the tines so that they follow the shorter kidney shaped path 18'. In the packer mode, instead of transferring the crop material from the intake duct 14 into the baling chamber, the tines 132 act only to redistribute the crop material in the intake duct by moving it away from the packer.

It will be clear to the person skilled in the art that various further modifications may be made to the embodiments described above. As an example, the lever 131 and the connecting rod 133 can be replaced by a disk with a continuous cam track driven by the shaft 128.

The invention claimed is:

1. A square baler comprising
a baling chamber and a plunger reciprocably mounted in the baling chamber,
an intake duct within which slices of crop material are accumulated for transfer into the baling chamber,
a stuffer having tines that may selectively execute a packer stroke to advance crop material partially along the intake duct and a stuffer stroke to transfer the crop material accumulated in the intake duct into the baling chamber, wherein the stuffer comprises a stuffer arm connected at a first pivot point to a crank arm that is driven to rotate at a multiple of the cycling rate of the plunger, and the stuffer arm is acted upon at a second pivot point by a cam track and follower arrangement selectively driveable with the crank arm by a disengageable clutch.

2. A square baler as claimed in claim 1, wherein the second pivot point of the stuffer arm is nearer to the intake duct than the first pivot point.

3. A square baler as claimed in claim 1, wherein the second pivot point of the stuffer arm is further from the intake duct than the first pivot point.

4. A square baler as claimed in claim 1, wherein the second pivot point is held stationary while the stuffer arm executes a stuffer stroke.

5. A square baler as claimed in claim 1, wherein the second pivot point is held stationary while the stuffer arm executes a packer stroke.

6. A square baler as claimed in claim 1, wherein the position of the second pivot point is defined by the cam track on the stuffer arm engaged by a follower carried by a second crank arm that is selectively rotated in synchronism with the first crank arm.

7. A square baler as claimed in claim 1, wherein the position of the second pivot point is defined by a follower carried by the stuffer arm engaging in the cam track that is selectively movable with the first crank arm.

8. A square baler as claimed in claim 1, wherein the crank arm is rotated at twice the frequency of the plunger so that the stuffer arm may perform a packer stroke followed by a stuffer stroke during each reciprocation of the plunger.

9. A square baler as claimed in claim 1, wherein the crank arm or cam track associated with the second pivot point is driven by the clutch configured such that engagement takes place in synchronism with the movement of the plunger.

\* \* \* \* \*